Figure 1:
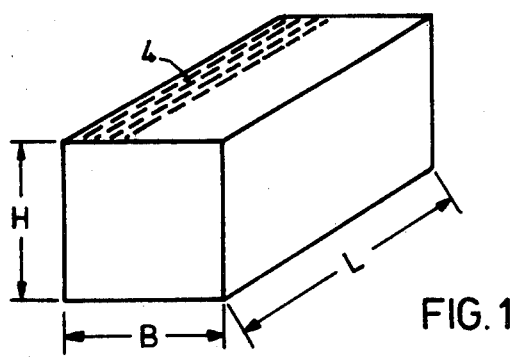

United States Patent [19]

Drinkuth et al.

[11] 4,448,914
[45] May 15, 1984

[54] AQUEOUS PREPARATION AND ITS USE IN THE PRODUCTION OF CERAMIC COMPOSITIONS

[75] Inventors: Franz Drinkuth, Odenthal; Wulf von Bonin, Leverkusen; Dietmar Schäpel, Cologne; Artur Lorenz, Konstanz-Litzelstetten, all of Fed. Rep. of Germany

[73] Assignee: Bayer Aktiengesellschaft, Leverkusen, Fed. Rep. of Germany

[21] Appl. No.: 448,841

[22] Filed: Dec. 10, 1982

[30] Foreign Application Priority Data

Dec. 24, 1981 [DE] Fed. Rep. of Germany ....... 3151374

[51] Int. Cl.³ .................... C04B 21/06; C04B 33/02; B28B 3/00
[52] U.S. Cl. ........................................ 524/32; 524/35; 524/52; 524/23; 501/80; 501/81; 501/82; 501/83
[58] Field of Search ................. 524/32, 35, 14, 23, 524/24, 26, 52; 501/80, 81, 82, 83

[56] References Cited

U.S. PATENT DOCUMENTS

| | | | |
|---|---|---|---|
| 1,992,916 | 2/1935 | Johnson | 501/83 |
| 4,004,933 | 1/1977 | Ravault | 501/81 |
| 4,253,999 | 3/1981 | Okishi | 524/48 |
| 4,374,216 | 2/1983 | Dammann | 524/35 |

*Primary Examiner*—John Kight, III
*Assistant Examiner*—Nathan M. Nutter
*Attorney, Agent, or Firm*—Connolly and Hutz

[57] ABSTRACT

An aqueous preparations of a gel-like consistency, containing
(a) oils in quantities of from 0.03 to 30% by weight,
(b) water-soluble or swellable vinyl polymers in quantities of from 0.2 to 10% by weight,
(c) water-soluble or swellable polymers based on natural substances in quantities of from 0.01 to 5% by weight,
(d) surfactants in quantities of from 0.01 to 2% by weight and optionally
(e) inorganic or organic powders in quantities of from 0.5 to 30% by weight.

The aqueous preparation is useful as a porosifying agent in the production of porous ceramic bodies.

7 Claims, 2 Drawing Figures

AQUEOUS PREPARATION AND ITS USE IN THE PRODUCTION OF CERAMIC COMPOSITIONS

Bricks for use in the building industry are generally made of clay, in some cases together with loam, sand ground and calcined clay and/or other mineral substances. To this end, the components are homogenised in a preparatory process in which they are intensively mixed in the presence of water. Thorough homogenisation of the clay mix is necessary if the bricks are to have high strength values. In order to enable the moist clay mix obtained to be pressed, it is adjusted to a special consistency in dependence upon the type of clay and upon the construction of the press, as described for example by Leusden, Ziegeleitecynisches Jahrbuch, 1974, pages 172–226, Bau-Verlag, Wiesbaden. The prepared mix is compression-moulded in a press to form moulding from which the brick is obtained after drying and baking.

In the context of the invention, clays are understood to be materials of the type commonly used in the building materials and ceramics manufacturing industry, i.e. the very finely particulate, light rocks which are formed by the weathering of rocks rich in feldspar and which may be regarded as typical representatives of cohesive soils. The cohesive properties are reflected in the agglomeration of the individual particles to form a cohesive mass which is plastic when wet and, on drying out, becomes solid and is easily cracked.

Compact bricks are heavy and show high thermal conductivity. There are various known processes for making lighter bricks of reduced thermal conductivity, including for example perforated and checker bricks and also completely porosified bricks. It is known that bricks can be porosified by the introduction of organic particles in the form of polystyrene beads, sawdust and other solids which burn out during the baking process and leave behind very little, if any, ash.

Although known porosifying processes favourably affect the porosity of the brick, some of them are nevertheless attended by serious disadvantages. Through the porosification of its body, the brick undergoes a drastic reduction in strength.

It has also been found that the use of dry porosifying materials complicates the preparation process.

The disadvantage of using polystyrene particles for example lies in the heavy loss by which preparation is accompanied. This disadvantage can be obviated by adding the polystyrene beads as late as possible during the production process, for example in the press. However, this generally results in inadequate mixing of the porosifying component with the clay mix. Another disadvantage of this known process lies in the elastic recovery of the polystyrene beads after the moulding has emerged from the press orifice.

The disadvantages of porosifying processes using other hydrophilic solids, such as for example sawdust and woodchips, are also attributable to the porosifying material. It is known that clay swells on taking up water. Conversely, clay shrinks on drying until it has a moisture content of from about 5 to 10% and then virtually stops shrinking. In principle, wood behaves in the same way. Wood only begins to shrink seriously when dried to a moisture content of less than 10%, so that the wood particles impede shrinking of the clay and disturb its structure through the formation of so-called microcracks. This deficiency is most pronounced when wood particles and clay are pressed after mixing of the mass and the wood particles are still able to take up water. In this case, they remove water from the constituent clay of the moulding and continue swelling, whereas the clay shrinks so that crack formation is intensified on account of the opposite behaviour of the two components. This factor results in a serious reduction in the strength of the brick and, accordingly, prevents any further reduction in weight in the case of large bricks.

It has also been proposed to add waste oil, heavy oil or similar, fully combustible organic liquids as porosifying agents during preparation of the raw brick mix. However, this proposal has never been successfully implemented both on account of the low degree of porosification obtained and on account of the difficulties of uniformly and homogeneously incorporating organic liquids of the type in question in the clay mixes without having to make unreasonable modifications to the preparation processes and machinery.

It is also known that aqueous solutions of polymers, such as polyacrylamide, or cellulose derivatives or even polymer dispersions develop a certain effect as plasticising aids in the processing of ceramic compositions, giving bodies of slightly reduced unit weight.

In addition, methods have been developed for converting ceramic slips into porous mouldings by introducing air following the addition of surfactants. Unfortunately, it has not been possible to use processes of this type in brick making because the air foam structure is uncontrollably destroyed in the processing machines and, as in cases where expanded polystyrene beads are added, the moulding emerging from the extruder under high pressure undergoes elastic recovery.

The object of the present invention is to provide an aid which avoids the disadvantages of known porosifying processes for ceramic compositions, particularly coarse ceramic compositions, such as clay bricks, brought about by processing difficulties, loss of plasticity, elastic recovery of the extrudate and loss of ultimate strength and which, on the contrary, is easy to use both as a processing aid and also as a porosifying agent with little effect on strength.

It has no been found that these requirements can be satisfied surprisingly favourably providing storable, aqueous preparations of oils and, optionally powders and special combinations of hydrophilic polymers, optionally together with surfactants, are used as porosifying aids.

The technical advantage of the proposed process lies not only in the fact that it leads to porosified ceramic compositions having surprisingly high strengths in view of the high degree of porosification obtainable, but also in the fact that the addition of the porosifying agents according to the invention makes homogenisation of the clay mix for example surprisingly easy, leads to high levels of plasticity coupled with excellent behaviour in the machines used for forming the raw mixes and, in addition, also accelerates drying of the mouldings without giving rise to increased crack formation.

Figure 2:
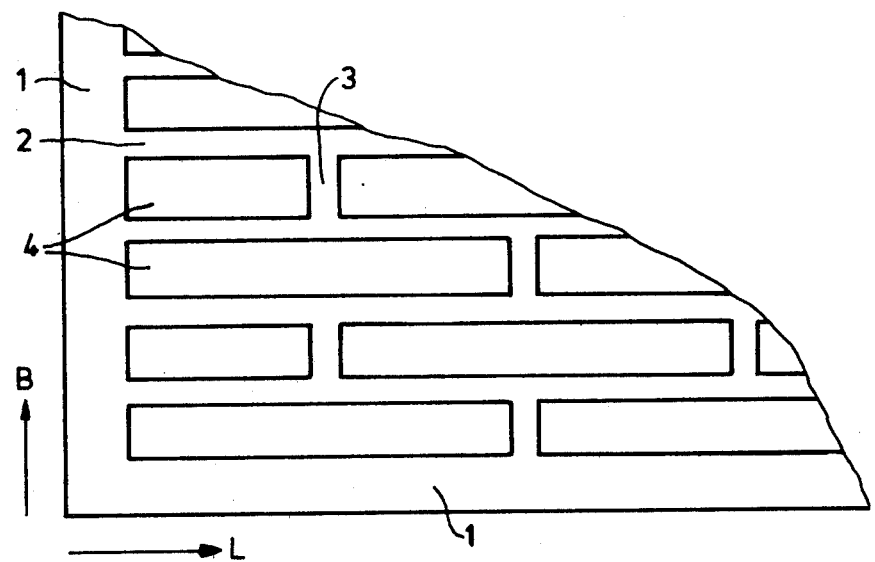

In particular, it is possible by the process according to the invention to make large blocks known as Euroblocks measuring 30 cm (width) ×49 cm (length) ×23.8 cm (height), as diagrammatically illustrated in FIGS. 1 and 2, or larger blocks with thinner intermediate webs, for example 4 mm thick, and to increase the number of rows of perforations parallel to the direction of the wall to 22 rows in 30 cm thick blocks increases the heat insulation capacity of the blocks and reduces their weight. Accordingly, the process according to the invention for porosifying ceramic compositions by the addition of organic components to the raw ceramic mix during the processing step before drying and baking, is characterised in that storable aqueous preparations of oils and optionally powders with combinations of vinyl polymers soluble in water or swellable in water until the grain boundaries diappear and polymers based on natural substances which are soluble in water or swellable in water until the grain boundaries disappear and, optionally, surfactants are used as the porosifying agent.

Particular interest is attributed to aqueous preparations of oils having boiling points above 100° C. and, more particularly, above 200° C. with combinations of polymers incorporating acrylamide which are soluble in water or swellable in water until the grain boundaries disappear and polymers based on modified cellulose which are soluble in water or swellable in water until the grain boundaries disappear, optionally together with surfactants and, optionally, powders.

According to the invention, the aqueous preparations used as porosifying agent contain:

(a) oils in quantities of from 0.03 to 30% by weight, preferably in quantities of from 0.5 to 20% by weight and, more particularly, in quantities of from 1.0 to 15% by weight, (b) water-soluble or swellable vinyl polymers in quantities of from 0.2 to 10% by weight, preferably in quantities of from 0.5 to 5% by weight and, more particularly, in quantities of from 0.75 to 2.5% by weight, (c) water-soluble or swellable polymers based on natural substances in quantities of from 0.01 to 5% by weight, preferably in quantities of from 0.02 to 2% by weight and, more particularly, in quantities of from 0.03 to 1% by weight, optionally (d) surfactants in quantities of from 0.01 to 2% by weight, preferably in quantities of from 0.02 to 2% by weight and, more particularly, in quantities of from 0.03 to 1% by weight and optionally (e) powders in quantities of from 0.5 to 30% by weight, preferably in quantities of from 1.0 to 20% by weight and, more particularly, in quantities of from 5 to 15% by weight.

It has been found that aqueous preparations with the above-indicated composition used in the porosification process according to the invention have a gel-like consistency with a high degree of homogeneity and long-term dispersion stability, i.e. stability in storage, which enables them to produce a degree of porosification exceeding the amount of oil and, optionally, powder incoporated whilst, at the same time, leaving the raw ceramic mixes containing them with excellent processing properties.

Oils having boiling points above 100° C. and, more particularly, above 200° C. are preferably used for the aqueous preparations according to the invention.

In the context of the invention, oils are understood to be fluid organic substances having viscosities below $10^4$cp (mPa.s) at 75° c., but above all the CHO- and CH-compounds normally regarded as oils. The oils in question may be cyclic or linear, aromatic, araliphatic or aliphatic, animal, vegetable or mineral or synthetic oils. It is particularly preferred to use inexpensive hydrocarbon oils obtainable for example from oil-bearing fruits or petroleum oil, such as for example the various fuel oil fractions, lubricating oil fractions and corresponding waste oils or even other technical oils such as, for example, so-called paraffin oil, white oil or even spindle oil which is particularly suitable.

These oils may be used either individually or in admixture with one another in the quantities already mentioned. Although the quantity indicated may in principle be exceeded at the preparation stage of the aqueous formulations, it is not recommended to do so in view of the increased content of organic material which would then be produced in the ceramic preforms. If the oils are used in quantities smaller than those indicated, the processing properties of the raw mixes to be porosified have been found to suffer.

The oil present in the aqueous preparations should have droplet diameters of from 0.1 to 100 microns and preferably from 1.0 to 50 microns.

In the context of the invention, polymers soluble in water or swellable in water until the grain boundaries disappear are understood in particular to be polymeric compounds of which solutions or swelling products in water have a viscosity of from 1000 to 10,000 mPa.S and higher at 20° C. for a solids content of 1% by weight and a shear velocity of 1 cm/sec. With higher solution and gel viscosities, the aqueous polymer preparations may assume the character of fluid to non-fluid gels.

In cases where a polymer of the type in question is present in dry or moist, granulated or powder form, it swells to such an extent in excess water that the original grain boundaries are no longer discernible, the swelling process possibly changing continuously into a dissolving process. The resulting "solutions" generally show non-newtonian flow behaviour. In the case of a gel-like consistency, it is immaterial whether the gel is a covalent gel or a secondary-valence gel.

According to the invention, vinyl polymers having the above-defined solution or swelling properties in aqueous medium are used in the above-mentioned quantities as component (b).

Vinyl polymers of the type in question are, for example, hydrolysis products of polyvinyl esters, such as polyvinyl alcohol, polymers and copolymers of (meth)acrylic acid or maleic anhydride, optionally in the form of their salts, polymers of vinyl pyrrolidone, vinyl amides, vinyl urethane, vinyl carbonate, vinyl methyl ether or acrylic esters containing water-soluble, neutral, acid or basic groups. Particular significance is attributed to acid, neutral or basic polymers containing substituted or preferably unsubstituted acrylamide groups, such as diacetone acrylamide polymers, hydrolysis products of polyacrylonitrile or polymerisation products of methacrylamide and, in particular, acrylamide, i.e. polymers which contain incorporated acrylamide units and which show the above-described behaviour in aqueous medium. In general, polymers of this type contain more than 30% by weight and preferably more than 50% by weight of incorporated acrylamide units and have molecular weights above 50,000 if they are to be used particularly successfully in the process according to the invention. They are used either individually or in the form of mixtures.

According to the invention, polymers based on natural substances which show the described behaviour in aqueous medium are used in the above-mentioned quantities as component (c).

Polymers of this type are understood in particular to be polymers based on polynucleotides, polypeptides, polysaccharides, such as casein, gelatin, alginate, carrageenate, xanthan, quar gum, bacterial polysaccharide, vegetable gums, starches, chitin, particularly cellulose, such as for example carboxymethyl cellulose, methyl cellulose or hydroxyethyl cellulose.

These polymers may be used either individually or in admixture with one another.

Surfactants are optionally used in the above-indicated quantities as component (d) of the aqueous preparations used in accordance with the invention.

The surfactants may be ionic or non-ionic wetting agents or emulsifiers, the boundaries being fluid. Of the large number of known groups of compounds suitable in principle for this application such as, for example, aromatic, aliphatic or araliphatic sulfonates, sulfonic acid esters, taurates, quaternised ammonium compounds, ethylene oxycopolymers, for example with propylene oxide, salts of fatty acids or complex esters thereof, fatty alcohols, sugar esters, ethylene oxide addition products with hydrophobic alcohols, amines or fatty acids, addition products of ethylene oxide with isononyl phenol, such as for example the addition product of 8 to 15 moles of ethylene oxide with isononyl phenol, have proved to be particularly suitable because surfactants such as these are suitably unaffected by ionic impurities of the type which may be present in ceramic compositions.

Powders are optionally used in the above-indicated quantities as component (e) of the aqueous preparations used in accordance with the invention.

The powders in question are fine powders and coarse powders, preferably of an organic or even inorganic nature, which for the most part have a particle size of at most 90 μm. At least 90% by weight of the powder should preferably have a particle size of less than 90 μm.

Of the large number of substances which are suitable in principle for this application, such as for example powders of the kernels and/or shells of, for example olives, stone fruit, nuts, legumes, straw, tree bark and wood, coal dust of the type which accumulates both in the dressing of mineral coal and also in the processing of lignite or which may be obtained from these types of coal or coke by grinding, has proved to be particularly suitable.

Suitable inorganic powders are, for example, calcium carbonate, pumice meal or silicate-containing products such as, for example, short glass fibres, microbeads, hollow microbeads, silica or glass powder.

The aqueous preparations of oils used as porosifying agent in accordance with the invention may be prepared either continuously or in batches. It is best initially to make up a preparation of the polymeric components (b) and (c), optionally (d) and optionally (e), in water and then to stir in the oil. However, it is also possible to combine all the components together or even in the form of their solutions in a mixing unit. Alternatively, a type of free-flowing powder-form or liquid concentrate may initially be prepared and then adjusted before application to the concentration in which it is to be used by the addition of the particular quantity of components, for example water, still required.

The aqueous oil preparations are added to the raw ceramic mixes for porosification in quantities of from 5 to 50% by weight, preferably in quantities of from 8 to 40% by weight and, more particularly, in quantities of from 10 to 35% by weight, based on the raw ceramic mix. In principle, the porosifying agent may be added at any stage of the preparation process for the raw mixes, although it is of course best added during the homogenisation process using disc feeders, kneaders or screw extruders.

FIGS. 1 and 2 illustrate the brick known as a Euroblock.

FIG. 1 is a perspective view. The letters H, B and L stand for height, width and length with the preferred dimensions referred to at the beginning. In FIG. 2 the rows 4 of perforations are shown enlarged, but substantially to scale as part of the area B×L. The brick consists of a relatively thick outer wall 1 9 mm thickness. The rows 4 of perforations are formed by webs 2 and 3 which, for the use of the aqueous preparations in accordance with the invention, require a thickness of only about 4 mm so that the number of rows can be increased to 22. The perforations themselves are 9 mm wide and 64 mm long. The preparation and effect of the porosifying agents are described in the following Examples in which the parts and percentages quoted represent parts and percentages by weight unless otherwise indicated.

EXAMPLE 1

1.8 parts of standard commercial polyacrylamide in the form of a "water-in-oil emulsion" (Retaminol PAE, a product of Bayer AG).
  active substance content: 25%
  molecular weight polyacrylamide: >50,000
  viscosity: approx. 1000-1500 mPa.s (as measured at 20° C. using a Brookefield viscometer),
0.95 part of hydroxyethyl cellulose
  degree of substitution 2.0-2.2
  viscosity: approx. 15,000 mPa.s (as measured on a 2% aqueous solution at 20° C. using a Haake viscometer)
0.2 part of emulsifier (adduct of 10 moles of ethylene oxide with 1 mole of nonyl phenol) and
11.7 parts of spindle oil (ISO VG 22 DIN 51519)
are successively introduced with mechanical stirring (1000 r.p.m.) over a period of 2 minutes into 85.35 parts of demineralised water. The mixture is then stirred for another 3 minutes at 1500 to 2000 r.p.m. A gel has formed 15 minutes after the end of mixing.

EXAMPLE 2

1 part of standard commercial high molecular weight polyacrylamide (Retaminol PA, a product of Bayer AG)
  molecular weight: >50,000
  viscosity: approx. 370 mPa.s (as measured on a 0.5% solution in tap water of average hardness at 20° C. using a Brookfield viscometer),
1 part of hydroxy ethyl cellulose degree of substitution: 2.0-2.2 viscosity: approx. 15,000 mPa.s (as measured on a 2% aqueous solution at 20° C. using a Haake viscometer),
0.2 part of emulsifier (adduct of 10 moles of ethylene oxide with 1 mole of nonyl phenol) and
10.0 parts of spindle oil (ISO VG 22 DIN 51519)
are successively added over a period of 5 minutes with mechanical stirring (1000 r.p.m.) to 88 parts of deminearlised water. The mixture is then stirred for another 2 minutes. A gel has formed 15 minutes after the end of mixing.

EXAMPLE 3

The mixture components used in Example 2 are mixed in various ratios by the method described in Example 2. A gel is obtained in each case.

| Test No. | 1 | 2 | 3 | 4 | 5 | 6 | 7 | 8 | 9 |
|---|---|---|---|---|---|---|---|---|---|
| Polyacrylamide | 1.0 | 1.0 | 1 | 0.75 | 0.75 | 0.5 | 0.5 | 0.5 | 0.5 |
| Hydroxyethyl cellulose | 0.75 | 0.5 | 0.30 | 1.0 | 0.5 | 0.3 | 1.0 | 0.75 | 0.5 |
| Spindle oil | 10.0 | 10.0 | 10.0 | 10.0 | 10.0 | 10.0 | 10.0 | 10.0 | 10.0 |
| Emulsifier | 0.2 | 0.2 | 0.2 | 0.2 | 0.2 | 0.2 | 0.2 | 0.2 | 0.2 |
| $H_2O$ | 88.05 | 88.30 | 88.50 | 88.05 | 88.50 | 88.75 | 88.30 | 88.55 | 88.8 |

EXAMPLE 4

1 part of standard commercial high molecular weight polyacrylamide (Retaminol PA, a product of Bayer AG)
  molecular weight: >50,000
  viscosity: approx. 370 mPa.s (as measured on a 0.5% solution in tap water of average hardness at 20° C. using a Brookfield viscometer),
1 part of hydroxyethyl cellulose
  degree of substitution: 2.0–2.2
  viscosity: approx. 15,000 mPa.s (as measured on a 2% aqueous solution at 20° C. using a Haake viscometer),
0.2 part of emulsifier (adduct of 10 moles of ethylene oxide with 1 mole of nonyl phenol),
2 parts of spindle oil (ISO VG 22 DIN 51519) and
10 parts of a coal dust mixture (80% <90 μm) based on lignite: mineral coal 1:1)
are successively introduced over a period of 3 minutes with mechanical stirring (800 r.p.m.) into 88 parts of demineralised water. The mixture is then stirred for another 4 minutes at 1500 r.p.m. A gel has formed 15 minutes after the end of mixing.

EXAMPLE 5

The mixture components used in Example 4 are mixed in various ratios by the method described in Example 3. A gel is obtained in each case.

| Test No. | 1 | 2 | 3 | 4 | 5 | 6 | 7 | 8 |
|---|---|---|---|---|---|---|---|---|
| Polyacrylamide | 1 | 1 | 0.75 | 0.75 | 0.5 | 0.5 | 0.5 | 0.5 |
| Hydroxyethyl cellulose | 0.75 | 0.5 | 0.5 | 0.3 | 1.0 | 0.75 | 0.5 | 0.3 |
| Spindle oil | 2 | 2 | 2 | 2 | 2 | 2 | 2 | 2 |
| Coal dust mixture | 10 | 10 | 10 | 10 | 10 | 10 | 10 | 10 |
| Emulsifier | 0.2 | 0.2 | 0.2 | 0.2 | 0.2 | 0.2 | 0.2 | 0.2 |
| $H_2O$ | 86.05 | 86.3 | 86.55 | 86.75 | 86.3 | 86.55 | 86.8 | 87.0 |

EXAMPLE 6

(a) Production of the granulate
  50 parts of lignite dust (80% <90 μm),
  3 parts of hydroxyethyl cellulose
    degree of substitution: 2.0–2.2
    viscosity: approx. 15,000 mPa.s (as measured on a 2% aqueous solution at 20° C. using a Haake viscometer),
  7.5 parts of high molecular weight polyacrylamide (Retaminol PA, a product of Bayer AG)
    molecular weight: >50,000
    viscosity: approx. 370 mPa.s
    (as measured on a 0.5% solution in tap water of medium hardness at 20° C. using a Brookfield viscometer),
  20 parts of spindle oil (ISO VG 22 DIN 51519) and
  2 parts of emulsifier (adduct of 10 moles of ethylene oxide with 1 mole of nonyl phenol)
are successively added to 50 parts of mineral coal dust (80% <90 μm), followed by mechanical mixing for 15 minutes in a laboratory mixer (make: Lodige, capacity 5 kg). A free-flowing granulate is formed.

(b) Production of the gel
13 parts of the granulate obtained in accordance with (a) are added over a period of 30 seconds with mechanical stirring (1000 r.p.m.) to 87 parts of water, followed by stirring for another 30 seconds at 1500 to 2000 r.p.m. A gel has formed 15 minutes after the end of the mixing process.

EXAMPLE 7

(a) Production of the granulate
The mixture components used in Example 6(a) are mixed in various ratios by the method described in Example 6(a).

| Test No. | 1 | 2 | 3 | 4 | 5 | 6 | 7 | 8 | 9 |
|---|---|---|---|---|---|---|---|---|---|
| Polyacrylamide | 10 | 7.5 | 7.5 | 7.5 | 7.5 | 5 | 10 | 7.5 | 10 |
| Hydroxyethyl cellulose | 5 | 5 | 3 | 5 | 5 | 15 | 10 | 4 | 3 |
| Lignite | 50 | 50 | 50 | 100 | — | 50 | 50 | 50 | 50 |
| Mineral coal | 50 | 50 | 50 | — | 100 | 50 | 50 | 50 | 50 |
| Spindle oil | 20 | 20 | 20 | 20 | 20 | 10 | 10 | 10 | 10 |
| Emulsifier | 2 | 2 | 2 | 2 | 2 | 1 | 1 | 1 | 1 |

(b) Production of the gel
The free-flowing granulate obtained in accordance with )(a), test No. 3, is mixed in different quantities by the method described in Example 6b). A gel is obtained in each case.

| Test No. | 10 | 11 | 12 | 13 | 14 | 15 |
|---|---|---|---|---|---|---|
| Granulate | 9 | 11 | 15 | 17 | 19 | 21 |
| Water | 91 | 89 | 85 | 83 | 81 | 79 |

EXAMPLE 8

1.8 parts of high molecular weight polyacrylamide in the form of a "water-in-oil emulsion" (Retaminol PAE, a product of Bayer AG)
  active substance content: 25%
  molecular weight of polyacrylamide: >50,000
  viscosity: approx. 1000–1500 mPa.s (as mesured at 20° C. using a Brookfield viscometer),
0.95 part of hydroxyethyl cellulose
  degree of substitution: 2.0–2.2
  viscosity: approx. 15,000 mPa.s (as measured on a 2% aqueous solution at 20° C. in a Haake viscometer),
2.35 parts of spindle oil (ISO VG 22 DIN 51519) and
9.50 parts of lignite dust (80% <90 μm)
are successively added over a period of 3 minutes with mechanical stirring (800 r.p.m.) to 85.5 parts of water. The mixture is stirred for another 3 minutes at 1000 to 2000 r.p.m. A gel has formed 15 minutes after the end of mixing.

EXAMPLE 9

2.10 parts of standard commercial high molecular weight polyacrylamide in the form of a "water-in-oil emulsion" (Retaminol PKE, a product of Bayer AG)
active substance content: 28%
molecular weight polyacrylamide: >5000
viscosity: approx. 600 mPa.s (as measured at 20° C. using a Rheomat A/I)
1.25 parts of hydroxyethyl cellulose
degree of substitution: 2.0–2.2
viscosity: approx. 15,000 mPa.s (as measured on a 2% aqueous solution at 20° C. using a Haake viscometer),
3.2 parts of spindle oil (ISO VG 22 DIN 51519) and
9.7 parts of coal dust mixture (80% <90μm, based on mineral coal/lignite 1:1)
are added over a period of 3 minutes with mechanical stirring (800 r.p.m.) to 83.75 parts of water. The mixture is then stirred for another 3 minutes at 1000 to 2000 r.p.m. A gel has formed 15 minutes after the end of mixing.

EXAMPLE 10

The mixture components used in Examples 8 and/or 9 are mixed in various ratios by the method described in Examples 8 and 9. A gel is obtained in each case.

| Test No. | 1 | 2 | 3 | 4 | 5 | 6 | 7 | 8 |
|---|---|---|---|---|---|---|---|---|
| Polyacrylamide, 25% | 2.0 | 2.0 | 3.8 | — | — | — | 3.0 | — |
| Polyacrylamide, 28% | — | — | — | 2.05 | 2.7 | 3.6 | — | 2.7 |
| Hydroxyethyl cellulose | 0.7 | 0.5 | 0.3 | 1.25 | 0.5 | 0.3 | 0.5 | 0.3 |
| Spindle oil | 1.5 | 1.0 | 0.5 | 2.0 | 1.4 | 0.8 | — | — |
| Lignite | 5.0 | 5.0 | 6.5 | 5.5 | 6.0 | 6.5 | 5.0 | 5.0 |
| Mineral coal | 5.0 | 5.0 | 6.5 | 5.5 | 6.0 | 6.5 | 5.0 | 5.0 |
| Water | 86.80 | 86.5 | 82.40 | 83.7 | 83.4 | 82.3 | 86.5 | 87 |

EXAMPLE 11

2.7 parts of standard commercial high molecular weight polyacrylamide in the form of a "water-in-oil emulsion" (Retaminol PKE, a product of Bayer AG)
active substance content: 28%
molecular weight polyacrylamide: >50,000
viscosity: approx. 600 mPa.s (as measured at 20° C., Rheomat A/I)
0.4 part of carboxymethyl cellulose
degree of substitution: 0.6–0.8
viscosity: approx. 1500 mPa.s (as measured on a 2% aqueous solution at 20° C. using a Haake viscometer)
3.2 parts of spindle oil (ISO VG 22 DIN 51519) and
9.7 parts of coal dust mixture (80% <90 μm, based on mineral coal/lignite 1:1)
are successively added over a period of 3 minutes with mechanical stirring (800 r.p.m.) to 84 parts of demineralised water. The mixture is stirred for another 2 minutes. Within 15 minutes, a gel has formed.

EXAMPLE 12

0.1 part of emulsifier (adduct of 10 moles of ethylene oxide with 1 mole of nonyl phenol),
3.6 parts of polyacrylamide and hydroxyethyl cellulose in the form of a "water-in-oil emulsion",
active substance content:
polyacrylamide: approx. 30%
molecualr weight: >50,000
hydroxyethyl cellulose: approx. 1.7%
viscosity: approx. 600 mPa.s (as measured on a 2% aqueous solution at 20° C. using a Haake viscometer) and
25.0 parts of spindle oil (ISO VG 22 DIN 51519)
are successively added to 71.3 parts of water and mechanically stirred for 2 minutes at 2000 to 2500 r.p.m. A gel has formed 10 minutes after the end of mixing.

EXAMPLE 13

(a) Preparation and homogenisation of the ceramic mix 30 parts by volume of the gel-like mixture obtained in accordance with Example 1 are added to 100 parts by volume of a loess/clay mixture (40 parts by weight of loess loam, 88% <0.2 mm, 45% <0.02 mm and 60 parts by weight of opalinus clay 98% <0.20 mm, 62% <0.02 mm) containing approximately 17% of water, based on the dry loess/clay mixture, followed by mixing in a laboratory sieve disc feeder (Manufacturer: Rieterwerke Dipl. Ing. Walter Handle, Constance). After homogenisation, the mix is adjusted to a stiffness equivalent to a residual peppercorn height of 30 mm.

(b) Production of the bricks

The clay mix obtained in accordance with (a) (density 1.9 g/cc) was pressed in a laboratory brick press (type: KLVA 80 laboratory vacuum unit, Manufacturer: Rieterwerke Dipl. Ing. Walter Handle GmbH, Constance) to form perforated bricks (perforation content 15%, based on the cross-section) and stored in the open for 4 days at room temperature to reach the equilibrium moisture content. The pressings were then heated for 8 hours in a drying cabinet and subsequently heated in an electric oven at 80° C. per hour to a final temperature of 970° C. which was maintained for 4 hours. The bricks then cooled down with the natural cooling of the oven.

After storage for 3 days at room temperature, the bricks were tested, producing the following results:
Total shrinkage: approximately 7.8% (linear)
Body density: 1.69 g/cc
Brick strength: 35 N/mm$^2$ (average value) (as measured on 10 test specimens measuring 55 mm (height)×57 mm (length)×27 mm (width)

EXAMPLE 14

Following the procedure of Example 13, the same loess/clay mixture was processed with a gel-like mixture obtained in accordance with Example 12 to form bricks. The following test results were obtained:
Total shrinkage: approximately 7.1% (linear)
Body density: 1.64 g/cc
Brick strength: 14 N/mm$^2$ (average value)

EXAMPLE 15 (Comparison)

Following the procedure of Example 13, the same loess/clay mixture was processed to form bricks without the gel-like mixture according to the invention. The test results obtained were as follows:
Total shrinkage: approximately 8.2% (linear)
Body density: 1.84 g/cc
Brick strength: 64 N/mm$^2$ (average value)

EXAMPLE 16

Following the procedure of Example 13, 64 parts by volume of the gel-like mixture obtained in accordance with Example 6(b) were added to 100 parts by volume of the same loess/clay mixture, followed by processing to form bricks. The test results were as follows:

Total shrinkage: approximately 7.9% (linear)
Body density: 1.56 g/cc
Brick strength: 20.0 N/mm² (average value)

EXAMPLE 17

Following the procedure of Example 13, 64 parts by volume of the gel-like mixture obtained in accordance with Example 10, test No. 4, were added to 100 parts by volume of the same loess/clay mixture, followed by processing into bricks. The test results obtained were as follows:

Total shrinkage: approximately 7.6% (linear)
Body density: 1.56 g/cc
Brick strength: 21.6 N/mm² (average value)

It will be appreciated that the instant specification and examples are set forth by way of illustration and not limitation, and that various modifications and changes may be made without departing from the spirit and scope of the present invention.

We claim:

1. In the production of porous ceramic bodies the improvement which comprises the addition to the ceramic mass of an aqueous porosifying agent containing
    (a) oils in quantities of from 0.03 to 30% by weight,
    (b) water-soluble or swellable vinyl polymers in quantities of from 0.2 to 10% by weight,
    (c) water-soluble or swellable polymers based on natural substances in quantities of from 0.01 to 5% by weight,
    (d) surfactants in quantities of from 0.01 to 2% by weight and optionally
    (e) inorganic or organic powders in quantities of from 0.5 to 30% by weight.

2. In the production of porous ceramic bodies according to claim 1 wherein said aqueous porosifying agent contains
    (a) oils in quantities of from 0.5 to 20% by weight and preferably in quantities of from 1.0 to 15% by weight,
    (b) vinyl polymers in quantities of from 0.5 to 5% by weight and preferably in quantities of from 0.75 to 2.5 % by weight,
    (c) polymers based on natural substances in quantities of from 0.02 to 2% by weight and preferably in quantities of from 0.03 to 1% by weight, optionally
    (d) surfactants in quantities of from 0.02 to 2% by weight and preferably in quantities of from 0.03 to 1% by weight and optionally
    (e) powders in quantities of from 1.0 to 20% by weight and preferably in quantities of from 5 to 15% by weight.

3. In the production of porous ceramic bodies according to claim 1 or 2 wherein the oil has a boiling point above 100° C.

4. In the production of porous ceramic bodies according to claim 1 or 2 wherein the oil has a viscosity below $10^4$ cp at 70° C.

5. In the production of porous ceramic bodies according to claim 1 or 2 wherein the vinyl polymer is a polyacrylamide having a molecular weight above 50,000.

6. In the production of porous ceramic bodies according to claim 1 or 2 wherein the polymers based on natural substances are cellulose and/or cellulose derivatives.

7. Ceramic mass containing about 5 to 50% by weight of an aqueous preparation containing
    (a) oils in quantities of from 0.03 to 30% by weight,
    (b) water-soluble or swellable vinyl polymers in quantities of from 0.2 to 10% by weight,
    (c) water-soluble or swellable polymers based on natural substances in quantities of from 0.01 to 5% by weight,
    (d) surfactants in quantities of from 0.01 to 2% by weight and optionally
    (e) inorganic or organic powders in quantities of from 0.5 to 30% by weight.

* * * * *